Oct. 18, 1949.  C. T. STEELE ET AL  2,485,329
ETHER PURIFICATION
Filed April 5, 1946
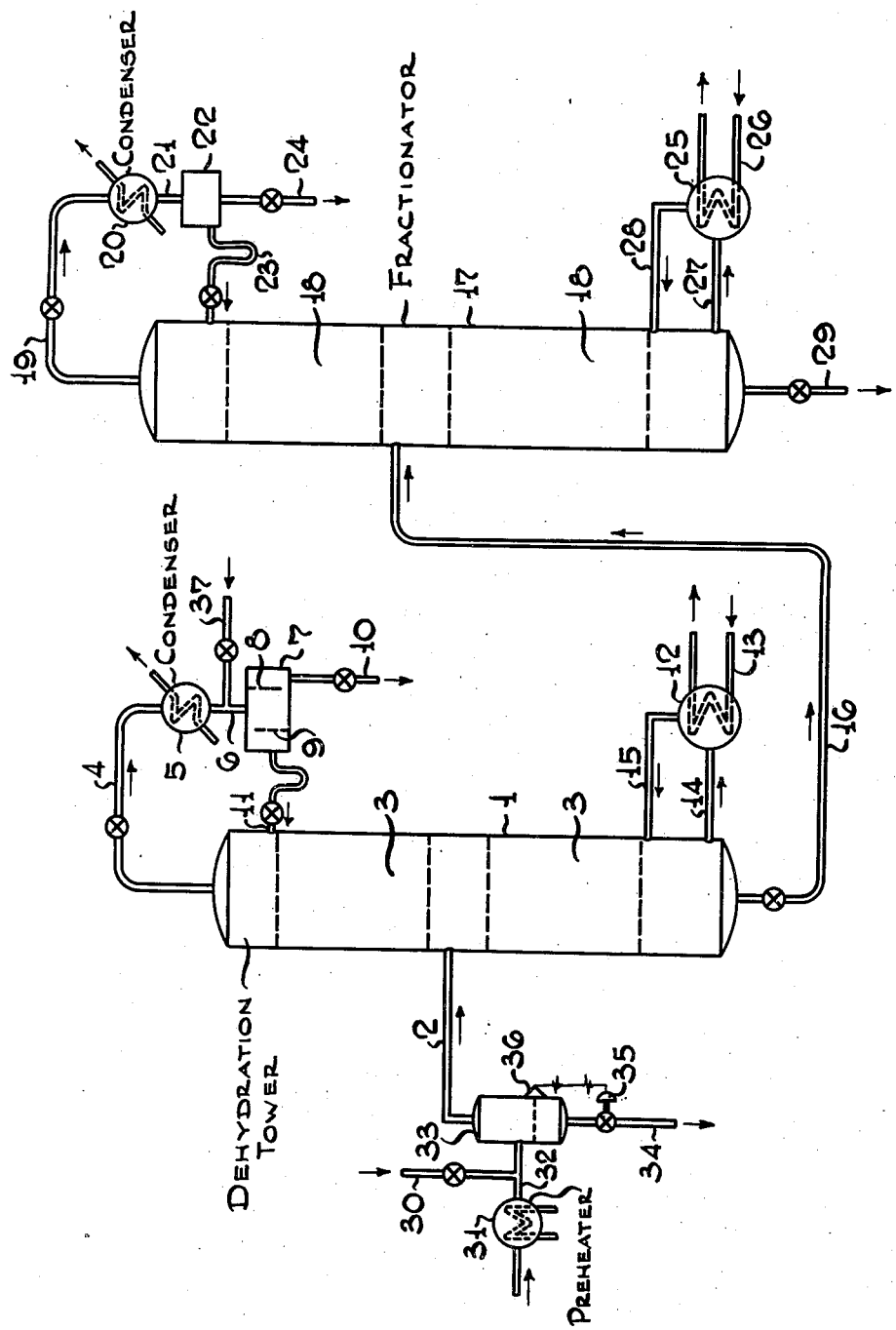
Clellie T. Steele
Mack C. Fuqua  Inventors
By J. H. Small  Attorney Patented Oct. 18, 1949

2,485,329

UNITED STATES PATENT OFFICE 2,485,329

ETHER PURIFICATION

Clellie T. Steele and Mack C. Fuqua, Baton Rouge, La., assignors to Standard Oil Development Company, a corporation of Delaware Application April 5, 1946, Serial No. 659,700

6 Claims. (Cl. 260—616)

This invention relates to a method of purifying a crude volatile aliphatic ether which tends to be contaminated by an aldehyde. More particularly, it relates to the purification of a crude ethyl ether such as that formed by the reaction of ethylene with sulfuric acid.

Crude ethyl ether as commercially synthesized generally contains water, alcohol, and higher boiling organic compounds, including polymers, as chief impurities and contains acetaldehyde as a minor impurity.

For a practical finishing treatment, water is first separated from the crude ether by distillation under pressure in a dehydration column, water vapor being taken overhead in an ether-water azeotrope for condensation, ether condensate being separated from water condensate, and the ether condensate containing a small amount of water being refluxed. Bottoms from the dehydration column contain dehydrated ether mixed with higher boiling organic impurities including alcohol and are fed to a second column for fractional distillation to separate the ether from the higher boiling organic impurities. However, difficulty was encountered in obtaining a purified ether product satisfactorily free of aldehyde by this operation.

An object of this invention is to provide an efficient method of preventing an aldehyde impurity from remaining with the ether recovered in finishing crude ether, particularly in a continuous treatment that involves a water separation step prior to a fractional distillation of the ether from higher boiling organic compounds.

It is now found that in the finishing treatment of crude ether appropriate conditions for converting the aldehyde impurity to higher boiling compounds are obtained, and the resulting higher boiling condensation products or resins to which the aldehyde is converted can be satisfactorily separated from the ether. The conversion of the aldehyde impurity is readily accomplished by introducing dilute aqueous alkali at proper points in the operation. Stronger alkaline aqueous solution may be used in forming higher aldehyde resins.

There are two appropriate points for carrying out the conversion of the aldehyde impurity in the continuous purification treatment. At these points, the conditions of conversion are suitable for practically complete conversion of the aldehyde and for removal of the conversion products without interfering with separation of the other impurities.

A satisfactory precedure by which the invention is practiced will be described with reference to the accompanying drawing.

In the drawing is a schematic flow plan of a continuous ether refining system for illustrating preferred embodiments of the invention.

Referring to the drawing, crude diethyl ether, containing water, aldehyde, alcohol, and other higher boiling impurities, is charged into a midsection of dehydration tower 1 from feed line 2. The tower 1 contains a packing 3, such as ceramic rings, to effect intimate contact of vapors with liquids. By having the crude ether preheated to a sufficiently high temperature, e. g., up to about 215° F., on entering tower 1, ether and water vapors are released from the crude ether feed and pass upwardly through the tower.

Dehydration is most conveniently carried out in tower 1 under superatmospheric pressure, preferably a pressure of about 100 to 150 pounds per square inch gauge. An overhead azeotrope mixture of ether-water vapors is withdrawn from tower 1 by line 4 to cooling condenser 5.

Ether and water condensates are passed from condenser 5 by line 6 to receiver 7, which is provided interiorly with a bath arrangement. Condensate entering the receiver 7 between a weir baffle 8 and a depending baffle 9 separates into two phases, an upper ether layer and a lower aqueous phase. The ether from the upper phase or layer overflows the baffle 8 and is returned by line 11 to an upper part of tower 1. The water phase is withdrawn from receiver 7 by line 10.

Under suitable conditions, a major proportion of the water in the overhead vapors is separated in the water phase. For example, if condensates entering the receiver 7 at a temperature of about 110° F. with water contents of about 3.5%, above 60% of the water is separated and only a small amount of the water is retained in the ether phase returned as reflux to tower 1.

Tower 1 is provided with a reboiler 12 containing a live steam heat exchange coil 13. Bottom liquids from tower 1 are circulated from tower 1 to reboiler 12 by line 14 and returned to tower 1 by line 15 to maintain sufficient heat in the tower for insuring vaporization of approximately all water from the bottoms.

Bottom liquids comprising ether and higher boiling organic liquids including alcohol are withdrawn from tower 1 and passed by line 16 to fractionating column 17, which is also loaded with a packing 18.

With a relatively lower pressure in column 17, e. g., 25 pounds per square inch gauge, and under adjusted temperatures, vapors of diethyl ether rise in column 17 and are withdrawn through overhead line 19 to cooling condenser 20. Ether condensate is passed from condenser 20 by line 21 to receiver 22, from which a portion of the condensate is refluxed to column 17 through line 23. Another portion of condensate is withdrawn from receiver 22 by line 24 as purified ether product for storage. Tower 17 is provided with a reboiler 25 including a steam coil 26 for heat exchange. Liquid bottoms of tower 17 are circulated between the tower 17 and reboiler 25 by lines 27 and 28. Liquid bottoms are discharged from tower 17 through line 29.

As indicated, acetaldehyde tends to accumulate in the liquid bottoms of tower 1 and is then carried over into tower 17, where separation of diethyl ether from acetaldehyde is difficult to obtain unless some provision is made for preventing the acetaldehyde from entering tower 17.

It was found that most of the acetaldehyde impurity is advantageously converted to higher boiling condensation products or resins that are insoluble in the ether by admixing aqueous alkali solution with preheated crude feed. The resulting condensation products are satisfactorily separated in aqueous alkali solution from the ether feed before entering the dehydration tower 1.

The aqueous alkali may be introduced from a supply line 30 into the crude ether flowing from preheater 31 through line 32. In a knock-out drum 33 to which the resulting liquid mixture flows, the aldehyde condensation products in the aqueous alkali solution settle to the bottom as a lower liquid phase for removal through a bottom drain line 34. By making valve 35 in drain line 34 responsive to a liquid level control instrument 36 attached to drum 33, a constant interface level is maintained between the ether liquid phase and the lower aqueous phase in drum 33. The thus-treated ether separated as an upper liquid phase is decanted by the feed line 2 into the dehydration tower 1. By this operation, an acetaldehyde content of about 0.25% or higher is reduced to approximately 0.1% by weight or less in the crude ether feed.

Although the described treatment of the crude ether prior to dehydration for removal of the aldehyde impurity has been generally suitable, another aldehyde removal step has been found even more desirable in the operation.

When the crude ether entering the dehydration tower 1 contains a very slight amount of the aldehyde impurity which tends to gradually increase in concentration within the dehydrating tower, in time the aldehyde impurity builds up also in the dehydration tower bottoms, and then interferes with the recovery of purified ether. This difficulty which arises from a gradual concentration of the aldehyde impurity in the dehydrating tower is overcome most effectively by introducing relatively small amounts of aqueous alkali solution into the overhead condensation product from dehydration tower 1, for example, by injecting alkali solution from line 37 into line 6. The admixture of the aqueous alkali solution with the dehydration tower condensate passed to receiver 7 brings about conversion of the acetaldehyde impurity to polymers or resins which remain in the water-rich phase separated from the ether-rich liquid phase in receiver 7. By use of this expedient, last traces of acetaldehyde are separated from the ether-rich phase to be refluxed to tower 1, and the aqueous alkali solution can be more satisfactorily prevented from entering the dehydration tower 1. It is important to avoid carry-over of caustic into the dehydration tower, where it would tend to interfere with the dehydration step, causing plugging and other difficulties.

The method of separating aldehyde impurities from crude ether in accordance with the present invention has been established to be of successful commercial application in a continuous procedure on industrial scale.

We claim:

1. In the purification of a crude volatile ether containing volatile aldehydes, water, and alcohol impurities, the steps which comprise preheating the crude ether for dehydration by distillation, mixing the preheated crude ether with aqueous alkali solution, separating an ether liquid phase from aqueous alkali solution phase containing conversion products of the aldehyde impurity, distilling from the separated liquid ether phase an ether-azetrope in dehydrating the ether to leave a liquid bottoms comprising dehydrated ether, and fractionally distilling from a residual dehydrated liquid portion of the ether an ether distillate separated from alcohol impurity.

2. In the purification of a crude ethyl ether containing acetaldehyde, water, and alcohol impurities, the steps which comprise distilling from the crude ether an ether-water azeotrope and acetaldehyde vapor mixture under superatmospheric pressure giving the vapor mixture an adequate water content to obtain formation of a water-rich liquid phase and a separate ether-rich liquid phase when condensed, condensing the vapor mixture, mixing resulting condensates with an aqueous alkali solution, separating the ether-rich liquid phase condensate from an aqueous alkali solution phase containing conversion products of the acetaldehyde impurity condensed in the azeotrope-acetaldehyde mixture, and refluxing the ether-rich liquid phase separated to the azeotrope distillation zone.

3. In a continuous process of purifying a crude ethyl ether containing acetaldehyde, water, and alcohol impurities, the step which comprises preheating the crude ether for dehydration by azeotropic distillation, mixing the preheated crude ether with an aqueous alkali solution, removing from the preheated crude ether the aqueous alkali solution containing acetaldehyde resins, distilling from the crude ether an ether-water azeotrope with remaining acetaldehyde in a dehydration zone, admixing aqueous alkali solution with distillate from the dehydration zone, separating ether-rich phase from the distillate and aqueous alkaline solution, refluxing the ether-rich phase to the dehydration zone, passing ether bottoms containing alcohol from the dehydration zone to a fractional distillation zone, and distilling ether from said bottoms in the fractional distillation zone.

4. In the purification of a crude volatile ether containing aldehyde, water and alcohol impurities, the steps which comprise distilling from the crude ether under superatmospheric pressure in a distillation zone an ether-rich distillate containing water and aldehyde, mixing said distillate with an aqueous alkali solution, separating an aldehyde-free ether-rich phase of said distillate from an aqueous alkali phase containing the aldehyde impurity, and refluxing the aldehyde-free ether-rich phase to the crude ether distillation zone.

5. In the purification of a crude volatile ether containing aldehyde, water and alcohol impurities, the steps which comprise distilling from the crude ether under superatmospheric pressure in a distillation zone an ether-rich distillate containing water and aldehyde, mixing said distillate with an aqueous alkali solution, separating an aldehyde-free ether-rich phase of said distillate from an aqueous alkali phase containing the aldehyde impurity, refluxing the aldehyde-free ether-rich phase to the crude ether distillation zone, removing bottoms from the distillation zone consisting of ether and alcohol impurities and fractionating the bottoms to separate the ether from the alcohol impurities.

6. In a continuous process of purifying a crude volatile ether containing aldehyde, water and alcohol impurities, the steps which comprise contacting the crude ether with an aqueous alkali solution, separating an ether-rich phase from the aqueous alkali phase which removes the bulk of the aldehyde impurity, passing the ether-rich phase to a distillation zone, distilling the ether-rich phase under superatmospheric pressure in the distillation zone, recovering overhead from the distillation zone an ether-rich distillate containing water and the remainder of the aldehyde impurity, contacting the ether-rich distillate with an aqueous alkali solution, separating an aldehyde-free ether-rich phase of said distillate from the aqueous alkali phase containing the remainder of the aldehyde impurity, refluxing the aldehyde-free ether-rich phase to the distillation zone, recovering bottoms from the distillation zone consisting substantially of ether and alcohol impurities and fractionating the bottoms to separate the ether from the alcohol impurities.

CLELLIE T. STEELE.
MACK C. FUQUA.

REFERENCES CITED

The following references are of record in the file of this patent:

UNITED STATES PATENTS

| Number | Name | Date |
| --- | --- | --- |
| 1,189,602 | Michaelis | July 4, 1916 |
| 1,312,475 | Flaherty | Aug. 5, 1919 |
| 1,544,569 | Foster | Nov. 29, 1920 |
| 1,893,870 | Palkin et al. | Jan. 10, 1933 |
| 2,050,600 | Cox et al. | Aug. 11, 1936 |